G. W. Reisinger,
Globe Valve.
No. 98,631. Patented Jan. 4, 1870.
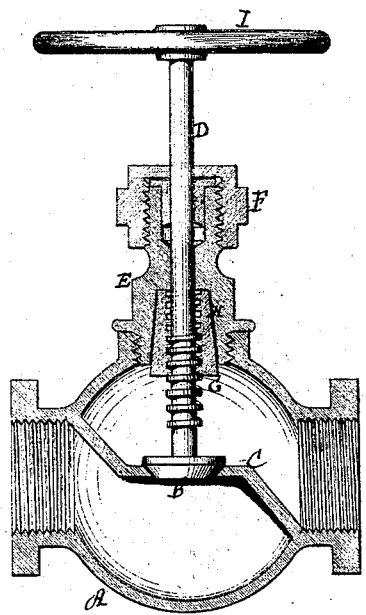
Witnesses:
A Bennewendorf
Mo R. Brook
Inventor:
G. W. Reisinger
per [signature]
Attorneys.

United States Patent Office.

GEORGE W. REISINGER, OF HARRISBURG, PENNSYLVANIA.

Letters Patent No. 98,631, dated January 4, 1870.

IMPROVEMENT IN GLOBE-VALVES.

The Schedule referred to in these Letters Patent and making part of the same

*To all whom it may concern:*

Be it known that I, GEORGE W. REISINGER, of Harrisburg, in the county of Dauphin, and State of Pennsylvania, have invented a new and useful Improvement in Globe-Valves; and I do hereby declare that the following is a full, clear, and exact description thereof, which will enable others skilled in the art to make and use the same, reference being had to the accompanying drawings, forming part of this specification.

This invention relates to a new and useful improvement in globe-valves for steam, water, or other fluids or liquids, whereby the valve may be ground on its seat without removing the steam or water-pressure, and at any time; and It consists in a cone-nut and conical cavity in the stem-box, as hereinafter more fully described.

The accompanying drawing represents a longitudinal section of a globe-valve constructed according to my invention.

Similar letters of reference indicate corresponding parts.

A is the globe or shell.

B is the valve, represented on its seat in the partition C.

D is the valve-stem.

E is the stem-box, which screws into the shell A.

F is the stuffing-box around the valve-stem.

G is the cone-nut.

The nut G, through which the stem passes, is made to tightly fit the conical cavity H, in the stem-box E. In this position it remains stationary, when the stem is turned in opening and closing the valve, and the operation is the same in effect as in valves of ordinary construction.

When it is tightly drawn up into the cavity H, by the valve-stem, it will retain its position, and act as a nut for the stem for any required period of time.

Should the valve become worn and leak, and require grinding, it is only necessary to raise the valve from its seat, and tap, with a hammer, on the end of the valve-stem, which will loosen the nut from its cavity. This allows the valve to be rotated or ground, as the nut will revolve with the stem.

When the valve has been sufficiently ground, or rendered tight, a jerk on the stem, by means of the hand-wheel I, will replace the nut in its cavity H, where it will be held by friction until it is loosened again by the means before described.

It will be seen that the valve may be ground at any time, whether under pressure or not, so that it may be kept constantly tight.

Having thus described my invention,

I claim as new, and desire to secure by Letters Patent—

In combination with a globe-valve, (or a valve which is opened and closed by means of a screw,) the conical nut G, and the conical cavity H, or their equivalents, when arranged to operate as and for the purposes described.

The above specification of my invention signed by me, this 20th day of October, 1868.

GEORGE W. REISINGER.

Witnesses:
GEORGE W. STOUFFER,
FR. W. HAAS.